United States Patent [19]

Carlson

[11] 4,395,245

[45] Jul. 26, 1983

[54] CHAIN COUPLING ELASTOMER COVER

[75] Inventor: Dennis L. Carlson, Waukesha, Wis.

[73] Assignee: Rexnord Inc., Milwaukee, Wis.

[21] Appl. No.: 146,557

[22] Filed: May 5, 1980

[51] Int. Cl.³ .......................... F16D 3/54; F16D 3/84
[52] U.S. Cl. ...................................... 464/49; 464/173
[58] Field of Search .................. 64/19, 12, 32 F, 32 R; 464/49, 173; 277/212 FB

[56] References Cited

U.S. PATENT DOCUMENTS

| | | | |
|---|---|---|---|
| 2,045,565 | 6/1936 | Belcher | 64/19 |
| 2,433,948 | 1/1948 | Good | 64/32 F |
| 2,534,635 | 12/1950 | Stillwagon | 64/32 |
| 2,547,734 | 4/1951 | Barager | 64/32 R |
| 2,575,602 | 11/1951 | Stillwagon | 64/17 |
| 2,587,365 | 2/1952 | Mize | 64/19 |
| 2,620,639 | 12/1952 | Burawoy | 64/19 |
| 2,648,208 | 8/1953 | Stillwagon | 64/32 |
| 3,430,457 | 3/1969 | Gee | 64/15 |
| 3,520,151 | 7/1970 | Resener | 64/19 |
| 3,528,526 | 9/1970 | Resener | 64/19 |
| 3,795,118 | 3/1974 | Kesl et al. | 64/32 |

FOREIGN PATENT DOCUMENTS 349788  6/1931  United Kingdom .................. 123/19

OTHER PUBLICATIONS

Catalog No. 48 Rev. A of Apex Machine & Tool Co., Dayton, Ohio, dated Nov. 1977.
Catalog No. LJ-105 of Lovejoy, Inc., Downers Grove, Ill. (undated).

Primary Examiner—Craig R. Feinberg
Assistant Examiner—Magdalen Moy
Attorney, Agent, or Firm—John M. Neary

[57] ABSTRACT

A semi-rigid elastomeric cover for a roller chain coupling which comprises a generally cylindrical center portion having its radial interior contoured to relatively tightly fit the contour of the roller chain and two opposed axially extending flanges connected to the center portion each flange terminating in a circular beaded portion dimensioned for a compression fit with the hub of the coupling.

9 Claims, 3 Drawing Figures

CHAIN COUPLING ELASTOMER COVER

BACKGROUND OF THE INVENTION

The present invention relates to covers for roller chain couplings, and more particularly to covers therefore used to retain lubricant at the coupling joint where misalignment is accommodated.

Roller chain couplings of the type with which the present invention is concerned typically include two identical steel coupling sprockets connected by a double strand of roller chain. The sprockets have axially extending hub portions for connection to substantially aligned shafts to transmit torque from one shaft to the other. Misalignment of the shafts is accommodated by the coupling through the double strand of roller chain.

Misalignment results in wear between the roller chain parts and between the chain rollers and the sprocket teeth. Typically, lubricant is applied to the roller chain to reduce such wear. As the speed of these couplings increases, the lubricant must be enclosed so that it will remain in contact with, and not be centrifugally thrown out of, the coupling.

Roller chain coupling covers have been found to suffer several drawbacks. Existing covers have been relatively rigid and manufactured from a rigid plastic or metal materials. Such covers comprise two semi-cylindrical halves that are fastened together after being placed over the coupling. Because of its rigidity, the cover requires a flexible seal at the location where the cover joins the coupling to retain the lubricant. The seals in such covers have proved inadequate in applications where misalignment caused the seal to wear unevenly resulting in the loss of lubricant from the interior of the cover. A second disadvantage associated with rigid covers is that the radial walls of the cover are spaced from the roller chain thereby allowing the lubricant to migrate away from the roller chain during operation of the coupling. Another disadvantage attributable to rigid covers is the relatively high cost associated with their manufacture and their multi-part construction.

Flexible covers have been used to retain lubricant in the flexing joints of universal joints and similar applications. However, covers of this type are also unsuitable for use with the roller chain couplings. Their flexibility allows the cover to expand radially during operation thereby allowing lubricant to migrate away from the roller chain where it is needed. Also, known covers of this type require the use of compression bands or other mechanical fastening means to secure the axial edges of the cover in place.

SUMMARY OF THE INVENTION

The cover constructed according to the principles of the present invention overcomes the difficulties encountered with both rigid and flexible covers that are known. The roller chain coupling cover of this invention comprises a semi-rigid elastomeric member to restrict radial expansion of the cover during operation. The cover includes a generally cylindrical center portion contoured on its radial interior to tightly engage the roller chain of the coupling and two opposed axially directed flanges connected to said center portion. Each of said flanges includes at its axially outermost edge a beaded portion dimensioned for a compression fit with one of the hubs of the coupling.

The following detailed description of the preferred embodiment will be made with references to the accompanying drawings in which:

FIG. 1 is a partial cross-sectional view of a cover constructed according to the principles of the present invention, FIG. 2 is a side view of the cover shown in FIG. 1, and FIG. 3 is a cross-sectional view of the cover of the present invention installed on a roller chain coupling.

DETAILED DESCRIPTION OF THE PREFERRED EMBODIMENT

Figure 2:
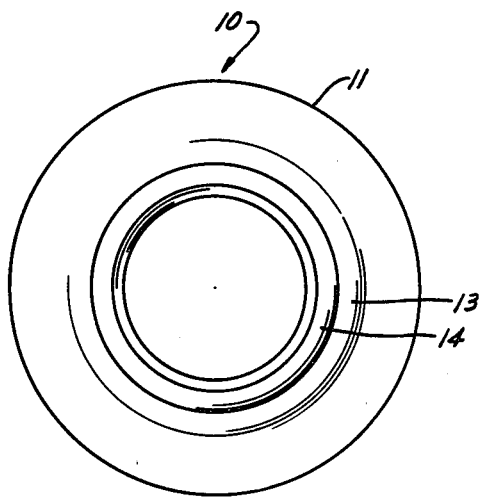
Figure 1:
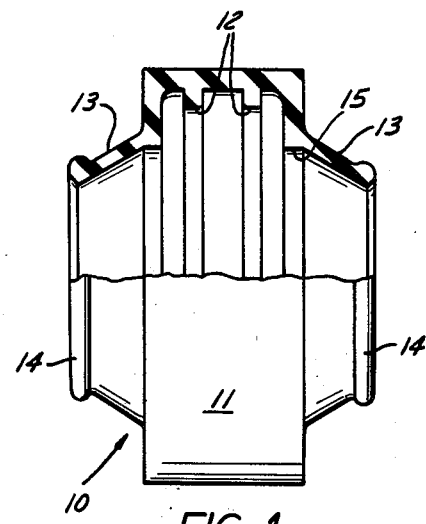

Referring to the drawings, there is shown in FIGS. 1 and 2 a roller chain coupling cover 10 constructed according to the principles of the present invention. The cover 10 comprises a semi-rigid elastomeric material, such as neoprene, preferably having a durometer hardness of 45–55 on the Shore A scale with a hardness of 50 being preferred. It has been found that an elastomer having this hardness provides a sufficient amount of elasticity to stretch the cover over the coupling 20 while providing sufficient rigidity to restrict radial expansion of the cover 10 during operation of the coupling 20 thereby retaining lubricant at the roller chain 22. It is believed that a hardness range of between 40 and 60 may prove adequate under some circumstances.

As shown, the center portion 11 of the cover 10 is generally cylindrical and contoured on its radial interior to closely complement the contour of the roller chain 22. The radially inwardly directed projections 12 on the cover 10 also provide additional material to increase the radial rigidity of the cover 10 in addition to insuring that lubricant is retained at the roller chain 22 where it is needed. The radially inner diameter of the axially outermost portions 15 of the center portion 11 is preferably substantially the same as the outer diameter of the hubs 23 to provide a relatively close fit between the cover 10 and the hubs 23. Extending axially from the center portion 11 of the cover 10 are two opposed radially inwardly sloping flanges 13 that terminate in circular beads 14 at the axially outermost edges of the flanges 13. The beads 14 and flanges 13 have a diameter that is preferably slightly less than the diameter of the hubs 23 of the coupling 20 to provide a compression fit on said hubs 23 when the cover 10 is installed without requiring any additional fastening means to secure the cover 10 to the hubs 23.

Figure 3:
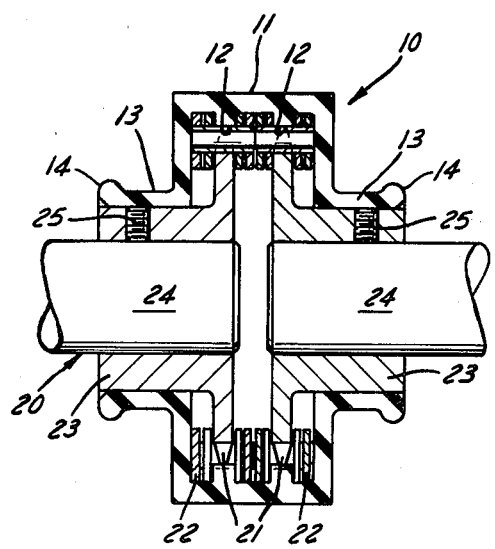

The cover 10 of the present invention is shown in FIG. 3 installed on a conventional roller chain coupling 20. The coupling 20 includes two identical steel coupling sprockets 21 connected by a double strand of roller chain 22. The sprockets 21 are attached to generally aligned shafts 24 by the hubs 23 of the coupling 20. As shown, threaded holes 25 extend radially through the hubs 23 to receive mating fasteners that secure the hubs 23 to their respective shafts 24.

The coupling cover 10 is installed by radially stretching the cover 10 and sliding it over the coupling 20. Final alignment of the cover 10 to the position shown in FIG. 3 can be accomplished using a standard tool to axially move the cover 10 as required.

It can be seen that the flanges 13 extend axially to the outermost edges of the hubs 23 thereby concealing the fasteners used to secure the hubs 23 to their respective shafts 24. Entrance of foreign matter into the coupling 20 is thereby prevented.

Lubricant is generally applied to the coupling 20 before installing the cover 10, however, additional lubricant can be injected into the coupling 20 by radially displacing one of the beads 14 and inserting the necessary amount of lubricant. Because the beads 14 and flanges 13 are dimensioned to provide a compression fit with the hubs 23 the lubricant is retained within the cover 10. As previously stated, the cover 10 is sufficiently rigid to restrict radial migration of the lubricant away from the roller chain 22 where it is needed. It has been found that a coupling cover 10 constructed according to the foregoing description provides sufficient rigidity for normal coupling speeds up to approximately 1800 RPM. As higher speeds are encountered it may be necessary to mount a conventional hose clamp, or such, on the exterior circumference of the center portion 11 of the cover 10 to prevent radial migration of the lubricant due to expansion of the cover 10.

While the present invention has been described with reference to the preferred embodiment disclosed herein, it is to be understood that modifications and variations may be made present without departing from the scope of the present invention as defined by the following claims.

I claim:

1. A semi-rigid elastomeric cover for a roller chain coupling of the type including two sprockets connected to two associated hubs for mounting on substantially aligned shafts, said sprockets having a diameter substantially greater than said hubs and being connected by a double strand of roller chain for transmitting torque from one shaft to the other; said cover comprising:
   a one-piece elastomeric member having a generally cylindrical center portion, a contour on the radial interior surface of said center portion configured to tightly fit the double strand of roller chain of said coupling, and two opposed axially extending, outwardly directed flanges connected to said center portion, said center portion having an interior diameter that is substantially greater than the interior diameter of said flanges.

2. A semi-rigid elastomeric cover as defined in claim 1 wherein said elastomer has a durometer hardness of substantially between 40 and 60 on the Shore A scale with a hardness of 50 being preferred.

3. A semi-rigid elastomeric cover as defined in claim 1 further comprising two circular beads each of which is connected to the axially outermost edge of one of said flanges.

4. A semi-rigid elastomeric cover as defined in claim 3 wherein said circular beads have a diameter less than the diameter of said hubs to provide a compression fit between said beads and said hubs.

5. A semi-rigid elastomeric cover as defined in claim 3 or 4 wherein said contour comprises two radially inwardly directed projections extending from said center portion each of which is positioned to fit against a circular row of rollers of said roller chain.

6. A semi-rigid elastomeric cover for a roller chain coupling of the type including two sprockets connected to two associated hubs for mounting on substantially aligned shafts; said sprockets being of a substantially greater diameter than said hubs and being connected by a double strand of roller chain for transmitting torque from one shaft to the other; said cover comprising;
   a one-piece elastomeric member having a generally cylindrical center portion, at least part of which has an inside diameter greater than said sprocket diameter, a pair of radially inwardly directed projections extending from said center portion, each of which is positioned to fit against a circular row of rollers of said roller chain, two opposed axially outwardly directed flanges connected to the radially innermost edges of said center portion and having portions whose interior diameter is smaller than said hub diameter, and two circular beads, each of which is connected to the axially outermost edge of one of said flanges, respectively.

7. A semi-rigid elastomer cover as defined in claim 6 wherein said elastomer has a durometer hardness of substantially between 40 and 60 on the Shore A scale with a hardness of 50 being preferred.

8. A semi-rigid elastomeric cover as defined in claim 6 wherein said hubs are straight cylinders and flanges gradually taper inwardly from said center portion to said beads.

9. A semi-rigid elastomeric cover as defined in claim 7 wherein the radially inner diameter of the axially outermost portions of said center portion is substantially equal to the outer diameter of said hubs and said circular beads have a diameter substantially less than the diameter of said hubs.

* * * * *